United States Patent
Atsuumi et al.

(10) Patent No.: US 7,050,438 B1
(45) Date of Patent: May 23, 2006

(54) CELL CREATION METHOD FOR CONTROL LINE SIGNALS OF ATM NETWORK AND MULTIPLEXING EQUIPMENT

(75) Inventors: Eisuke Atsuumi, Fukushima-ken (JP); Kimitoshi Takeuchi, Fukushima-ken (JP); Hiroaki Hashimoto, Fukushima-ken (JP); Tatsuya Suzuki, Fukushima-ken (JP)

(73) Assignee: Hitachi Telecom Technologies, Ltd., Koriyama (JP)

( * ) Notice: Subject to any disclaimer, the term of this patent is extended or adjusted under 35 U.S.C. 154(b) by 0 days.

(21) Appl. No.: 09/520,841

(22) Filed: Mar. 8, 2000

(30) Foreign Application Priority Data

Mar. 8, 1999   (JP)   ............................................ 11-060239

(51) Int. Cl.
    *H04J 3/12*   (2006.01)

(52) U.S. Cl. .................... 370/395.1; 370/433; 370/439; 370/508; 370/522; 370/529; 709/231

(58) Field of Classification Search .............. 370/395.1, 370/395.2, 395.3, 395.4, 391, 389, 241.1, 370/433, 438, 439, 522, 528, 527, 529, 508; 709/227, 230, 231, 232, 236, 237
See application file for complete search history.

(56) References Cited

U.S. PATENT DOCUMENTS

| 5,509,007 A | * | 4/1996 | Takashima et al. | ......... 370/391 |
| 6,134,249 A | * | 10/2000 | Nakao | ......... 370/528 |
| 6,272,137 B1 | * | 8/2001 | Noiri | ......... 370/395.1 |

* cited by examiner

*Primary Examiner*—Steven Nguyen
*Assistant Examiner*—Roberta Stevens
(74) *Attorney, Agent, or Firm*—Mattingly, Stanger, Malur & Brundidge, P.C.

(57) ABSTRACT

A multiplexing equipment included in an ATM network to transmit control line signals for interfacing data communication terminals. The transmission of the control line signals is realized by reserving a field in a payload in a cell format for the control line signal transmission between the data communication terminals, mapping RS/CD, CS, ER/DR, CI of the control line signals at intervals based on a terminal speed, multiplexing the mapped control line signals at the transmission side, and separating the multiplexed control line signals at reception side.

10 Claims, 8 Drawing Sheets

FIGURES INDICATE LATCH TIMING NUMBERS.

FIGURES INDICATE LATCH TIMING NUMBERS.

US 7,050,438 B1

CELL CREATION METHOD FOR CONTROL LINE SIGNALS OF ATM NETWORK AND MULTIPLEXING EQUIPMENT

BACKGROUND OF THE INVENTION

1. Field of the Invention

This invention relates to an ATM network, and particularly to a cell creation method for control line signals and its equipment for transmitting the control line signals via the ATM network. In this specification, the control line signals are defined as signals, which are transmitted in addition to user data, indicating the control line information between data communication equipment (information terminals).

2. Description of Related Art

In the ATM network of prior art, data transmission between a pair of data communication equipment is operated in a constant fix mode (full duplex communication) because no slot is made available for multiplexing the control line information of the data communication equipment into an ATM Header.

Because of the inability to transmit the control line information in the conventional ATM network, it makes difficult to connect on-line terminals, which provide data service by transmitting and receiving the control line signals in a half duplex communication mode, to the ATM network.

SUMMARY OF THE INVENTION

The present invention is made by considering the above mentioned points. An object of the present invention is to provide a cell creation method for the control line signals in the ATM network which enables to transmit user data and the control line signals used for processing in the data communication equipment, and to provide multiplexing equipment included in the ATM network realizing the cell creation method for the control line signals.

Another object of the present invention is to provide means for modifying the signal RS/CD among the control line signals to be transmitted so as to prevent the missing of the head portion or the bottom portion of the user data signal, and to assure the full acquisition of the signal.

The objects of the present invention are accomplished by a cell creation method of control line signals for an ATM network comprising a plurality of multiplexing equipment realizing communication among information terminals, comprising the steps of creating cells from user data to be transmitted between a pair of the communicating information terminals and control line signals indicating control line information relating the transmission of the user data at the multiplexing equipment connected to the pair of the communicating information terminals respectively, and transmitting the cells including the user data and the control line information between the pair of the communicating information terminals.

In a preferred aspect of the present invention, there is provided a cell creation method of control line signals, wherein a portion of a cell payload to be transmitted is mapped for transmitting the control line signals when creating the cell from the control line signals, and the control line signals are multiplexed into the cell at the transmission side and separated from the cell at reception side.

Alternatively, in another preferred aspect of the present invention, the signal RS/CD of the control line signals may be extended for a predetermined period before said signal RS/CD is multiplexed.

Furthermore, in another preferred aspect of the present invention, the multiplexing equipment connected to the pair of the communicating information terminals may have two operating modes which can be selected, one being a control line signal transmission mode for transmitting the control line signals by creating the cell from the control line signals, the other being a constant fix mode for executing a full duplex communication.

The objects of the present invention are also accomplished by a multiplexing equipment, being one of a plurality of multiplexing equipment included in an ATM network for realizing communication between information terminals, connected to one of the communicating information terminals, comprising, multiplexing means creating cells from control line signals outputted from one of the information terminals at the transmitting side, and separation means separating the control line signals from the cells transmitted via the ATM network and outputting the separated control line signals to one of the information terminals at reception side.

DESCRIPTION OF THE PREFERRED EMBODIMENTS

An embodiment of an ATM network in accordance with the present invention will now be described.

Figure 1:
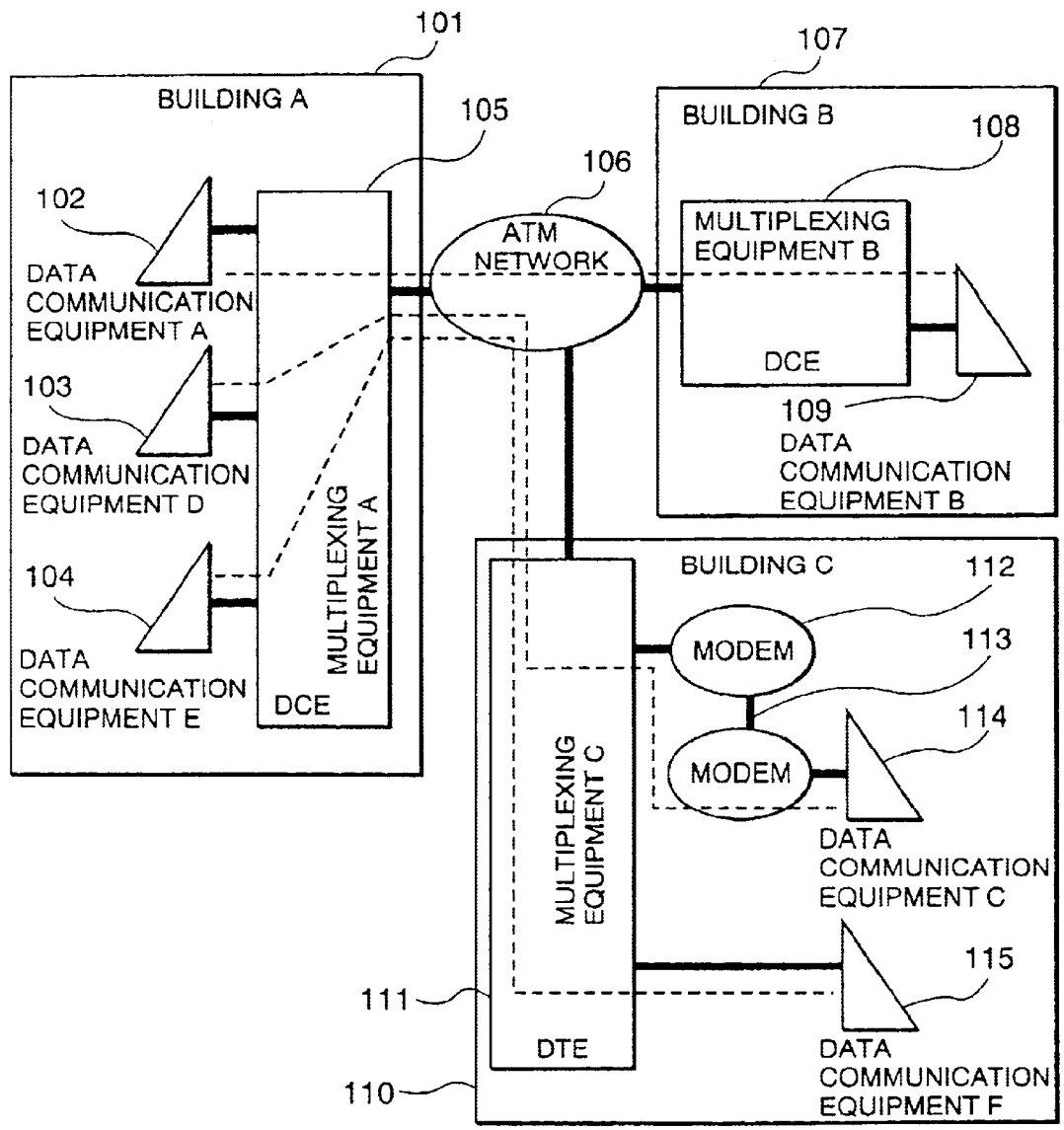
FIG. 1 is a schematic illustration showing an example of ATM network of the present invention.

FIG. 1 shows an example of configuration of the ATM network in the present embodiment. In the ATM network of the present embodiment, multiplexing equipment A 105 is connected to data communication equipment A 102, D 103 and E 104 having one of X.21, V.24 and V.35 functions in a building A 101. Multiplexing equipment B 108 is connected to data communication equipment B 109 having one of X.21, V.24 and V.35 functions in a building B 107. Multiplexing equipment C 111 is connected to modems 112, 113 connected to data communication equipment C 114 having one of X.21, V.24 and V.35 functions, and to data communication equipment F 115 having DCE (Data Circuit Terminating Equipment) function in a building C 110.

As shown by dotted lines in the example of FIG. 1, the data communication equipment A 102 connected to the multiplexing equipment A 105 in the building A 101 communicates with the data communication equipment B 109 connected to the multiplexing equipment B 108 in the building B 107 via the ATM network 106. Furthermore, the data communication equipment D 103 connected to the multiplexing-equipment A 105 in the building A 101 communicates with the data communication equipment C 114 connected to the multiplexing equipment C 111 in the building C 110 via the ATM network 106. The data communication equipment E 104 connected to the multiplexing equipment A 105 in the building A 101 communicates with the data communication equipment F 115 connected to the multiplexing equipment C 111 in the building C 110 via the ATM network 106.

Figure 2:
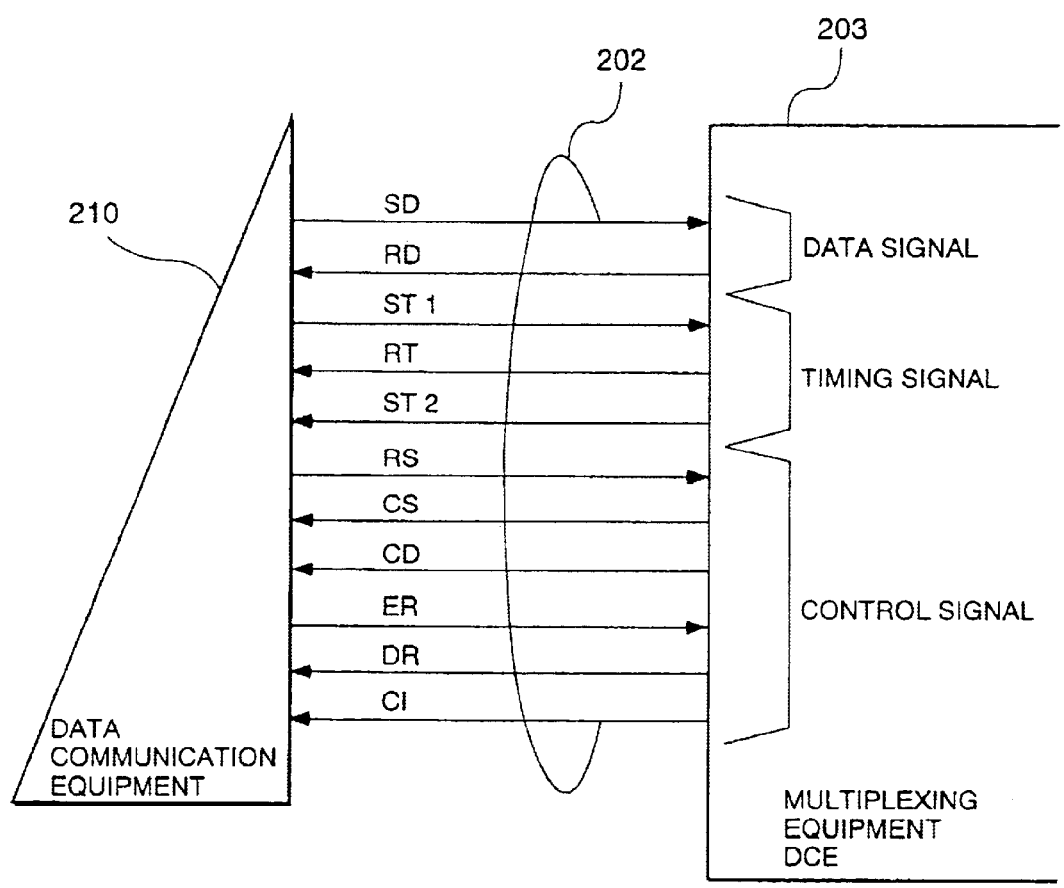
FIG. 2 is a schematic illustration showing signal lines required for communication between data communication equipment.

FIG. 2 shows a group of control lines 202 required for the communication with the data communication equipment 201. The control lines 202 includes signals such as SD, RD, ST1, RT, ST2, RS, CS, CD, ER, DR and CI.

The signal SD (Send Data) is data transmitted from the data communication equipment.

The signal RD (Receive Data) is data transmitted to the data communication equipment.

The signal ST1 (Signal Timing 1) is data signal receive element timing from the data communication equipment.

The signal ST2 (Signal Timing 2) is data signal send element timing of the data communication equipment.

The signal RT (Receive Timing) is data signal receive element timing of the data communication equipment.

The signal RS (Request to Send) indicates an existence of data to be output to the DCE.

The signal CS (Clear to Send) indicates that the DCE is ready to send data to a communication channel.

The signal CD (Carrier Detect) indicates that the DCE is receiving effective signal from a communication channel.

The signal ER (Equipment Ready) indicates that a DTE (Data Terminal Equipment) is ready for data input/output from/to the DCE.

The signal DR (Dataset Ready) indicates that the DCE is ready to be activate.

The signal CI (Call Indicate) indicates that the DCE is called from a communication line.

The multiplexing equipment of the present embodiment multiplexes major control line signals such as RS, CS, CD, ER, DR and CI into a cell in addition to use data.

Figure 3:
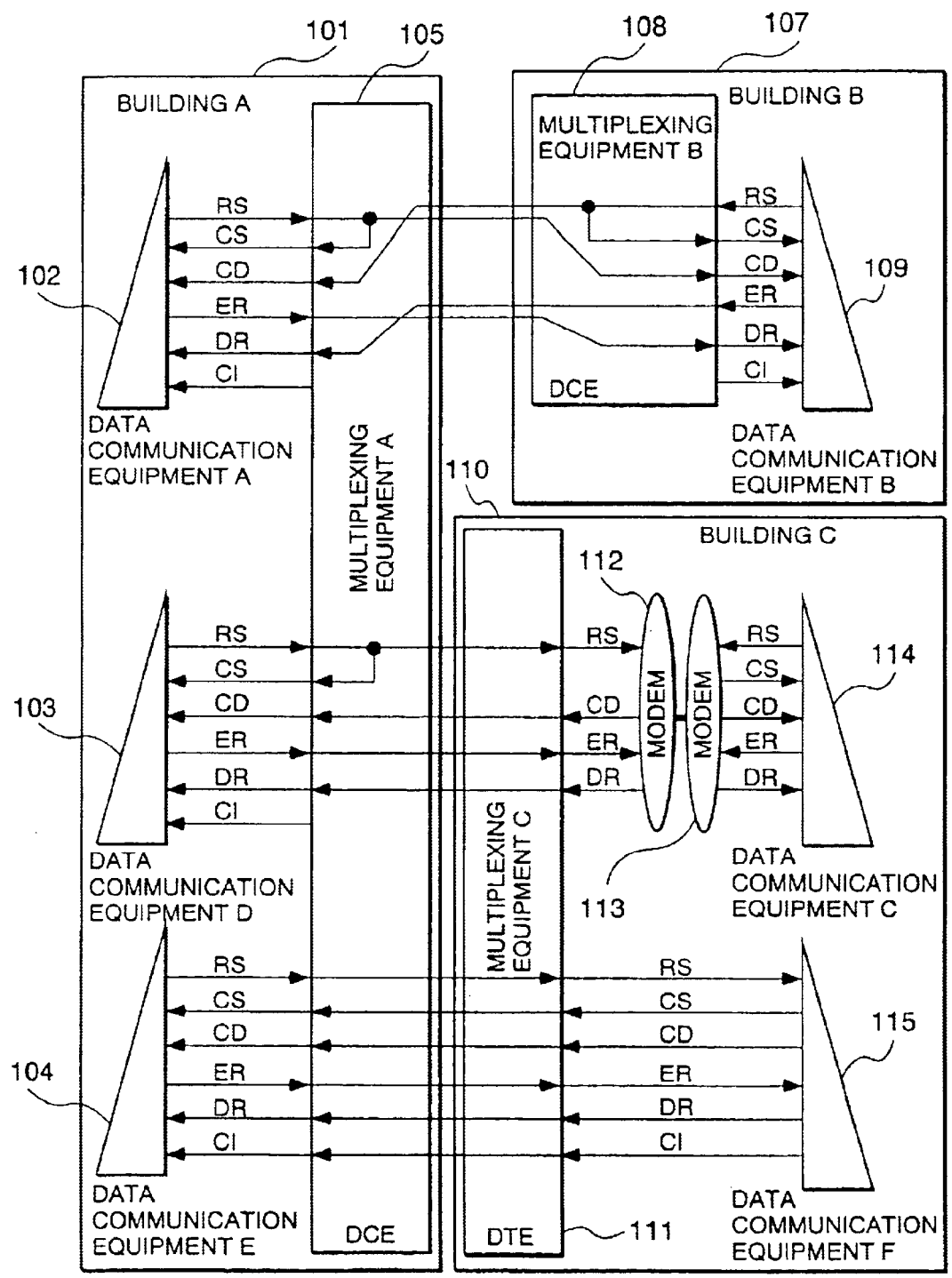
FIG. 3 is a schematic illustration showing an example of transmission modes of the control signals.

Signals to be multiplexed have directions depending on the mode, i.e., DCE or DTE of FIG. 1. For example, as shown in FIG. 3, the data communication equipment A 102, B 109. D 103 and E 104 are connected in the DCE mode, and the data communication equipment C 114 and F 115 are connected in the DTE mode.

FIG. 3 shows an example of the transmission formats of the control line signals in each building. Note that the ATM network 106 connecting the data communication equipment is omitted in FIG. 3.

The control line signal transmission from the DCE mode to the DCE mode is explained using the data communication equipment A 102 and B 109 as an example.

The control line signals RS and ER are transmitted from the multiplexing equipment A 105 to the multiplexing equipment B 108 via the network (not indicated in the figure). The control line signals RS and ER are transmitted to the data communication equipment B 109 as the control line signals CD and DR respectively.

The control line signal transmission between the DTE mode and the DCE mode is explained using the data communication equipment E 104 and F 115 as an example.

The control line signals RS and ER from the communication equipment E 104 are transmitted to the data communication equipment F 115 as the control line signals RS and ER through the multiplexing equipment A 105, the network (not indicated in the figure) and the multiplexing equipment C 111. The control line signals CS, CD, DR and CI from the data communication equipment F 115 are transmitted to the data communication equipment E 104 as the control line signals CS, CD, DR and CI through the multiplexing equipment C 111, the network (not indicated in the figure) and the multiplexing equipment A 105.

Although the modems 112, 113 are disposed between the multiplexing equipment C 111 and the data communication equipment C 114, the control line signal transmission between the DCE mode and the DTE mode among the data communication equipment D 103 and C 114 may be carried out in the same way as in the example of the data communication equipment E 104 and F 115.

Figure 4:
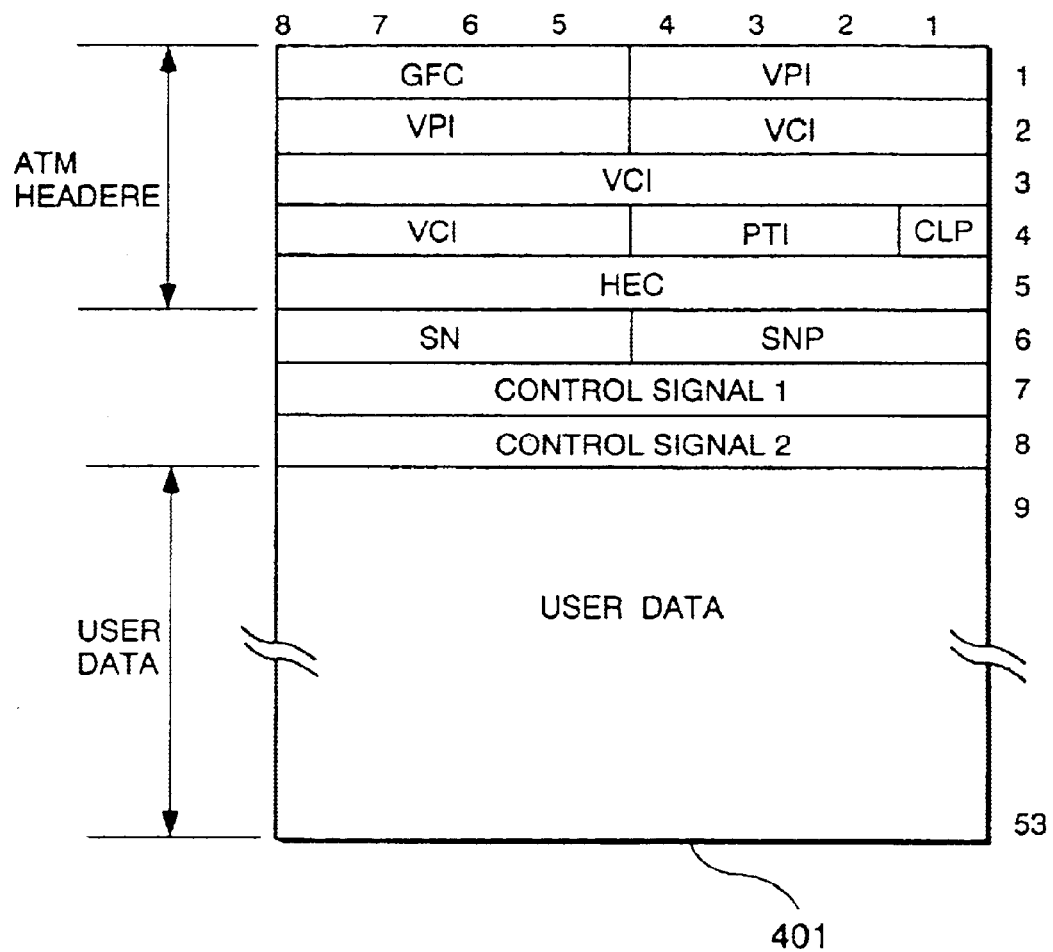
FIG. 4 is a schematic illustration showing an example of a cell format used in the present invention.

FIG. 4 shows an example of the cell format used in the present embodiment.

In this example of the cell format, a payload includes a User Data field, a control line signal transmission field for transmitting the control line signals, SN (Sequence Number) field and SNP (Sequence Number Protect) field, in addition to TTC standard ATM Header.

The ATM Header includes data such as GFC (General Flow Control), VPI (Virtual Path Identifier), VCI (Virtual Channel Identifier), PTI (Payload Type Identifier), CLP (Cell Loss Parity display), and HEC (Header Error Control).

The payload field includes fields such as the SN (Sequence Number) field, SNP (Sequence Number Protection) field, control line signal transmission field including the control line signal 1 and the control line signal 2, and the User Data field. In this example, the signal RS/CD are multiplexed as the control line signal 1, and the control line signals CS, ER/DR, CI are multiplexed as the control line signal 2.

The cell format of the present example enables the communication and the transmission of the control line signals between the data communication equipment A 102 and B 109, the data communication equipment D 103 and C 114, the data communication equipment E 104 and F 115 via the multiplexing equipment A 105, B 108, C 111 and the ATM network 106 as shown in FIG. 1.

Figure 5:
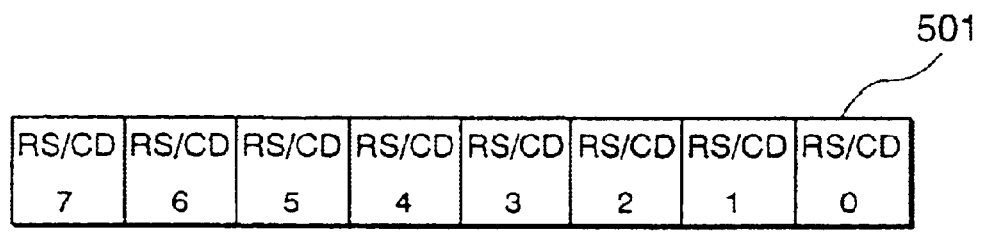
FIG. 5 is a schematic illustration showing an example of a multiplexing format of the control line signal 1 in FIG. 4.
Figure 6:
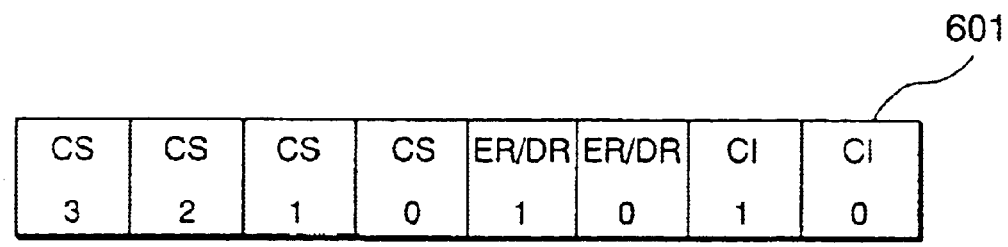
FIG. 6 is a schematic illustration showing an example of a multiplexing format of the control line signal 2 in FIG. 4.

FIGS. 5, 6 illustrate examples of a multiplexing format of the control line signals enabling the transmission of the control line signals in the present embodiment.

FIG. 5 shows an example of the multiplexing format 501 for the signal RS/CD that becomes the control line signal 1 in the cell format shown in FIG. 4. In the example, the signal RS is latched at 45-bit interval of the terminal speed, and multiplexed into the cell. 8 bits of the signal RS/CD is multiplexed in each cell.

FIG. 6 shows an example of the multiplexing format 601 for the signals CS, ER/DR, CI which become the control line signal 2 with the cell format shown in FIG. 4. In the example, the signal CS is latched at 90-bit interval of the terminal speed, and multiplexed into the cell. 4 bits of the signal CS is multiplexed in each cell. The signals ER and CI are latched at 180-bit interval, and multiplexed into the cell. 2 bits of the signals ER and CI are multiplexed into each cell.

Next, an example of block structure of a multiplexing unit in the multiplexing equipment, and an example of latch timing for each signal in the multiplexing unit will now be explained with reference to FIG. 7A and FIG. 7B.

Figure 7A:
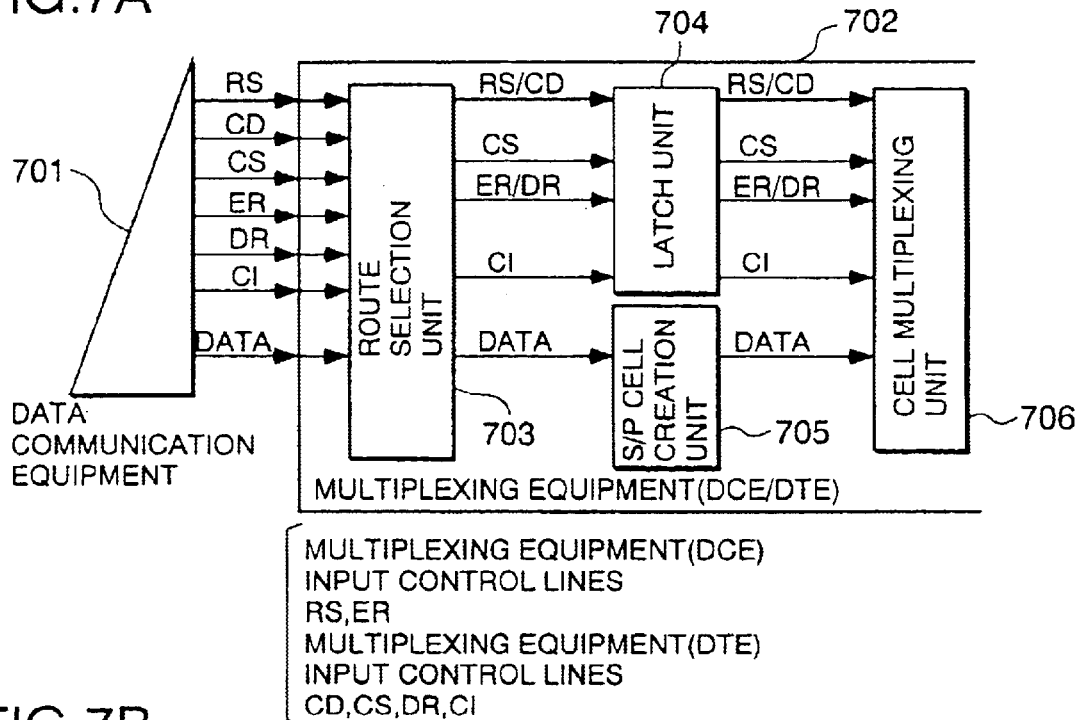
FIG. 7A is a schematic illustration showing a block structure of a multiplexing equipment realizing the control line signal multiplexing function in accordance with the present invention.

As shown in FIG. 7A, the present example of multiplexing equipment 702 comprises a route selection unit 703, a latch unit 704, a S/P cell creation unit 705 and a cell multiplexing unit 706. In the present example, the multiplexing equipment 702 is assumed to be operated in the DCE/DTE mode.

In the present example of the multiplexing equipment 702, the route selection unit 703 makes the selection of routes in accordance with a current mode (DCE or DTE) for the control line signals RS, CD, CS, ER, DR, CI inputted from data communication equipment 701, and outputs as the signals RS/CD, CS, ER/DR, CI. The S/P cell creation unit 705 conducts serial/parallel conversion of the data signal at 8-bit unit.

The signals RS/CD, CS, ER/DR, CI outputted from the route selection unit 703 are latched at the latch unit 704. As shown in FIG. 7B, the signals RS/CD, CS, ER/DR and CI are latched respectively at a RS/CD latch timing (a 45-bit interval of the terminal speed), a CS latch timing (a 90 bit interval of the terminal speed) and a ER/DR/CI latch timing (a 180-bit interval of the terminal speed).

The cell multiplexing unit 706 multiplexes the signals RS/CD, CS, ER/DR and CI outputted from the latch unit 704 with predetermined cell creation timings at locations shown in FIGS. 5, 6. The cell multiplexing unit 706 creates cells with the multiplexed signals and the data signal outputted from the S/P cell creation unit 705.

Figure 7B:
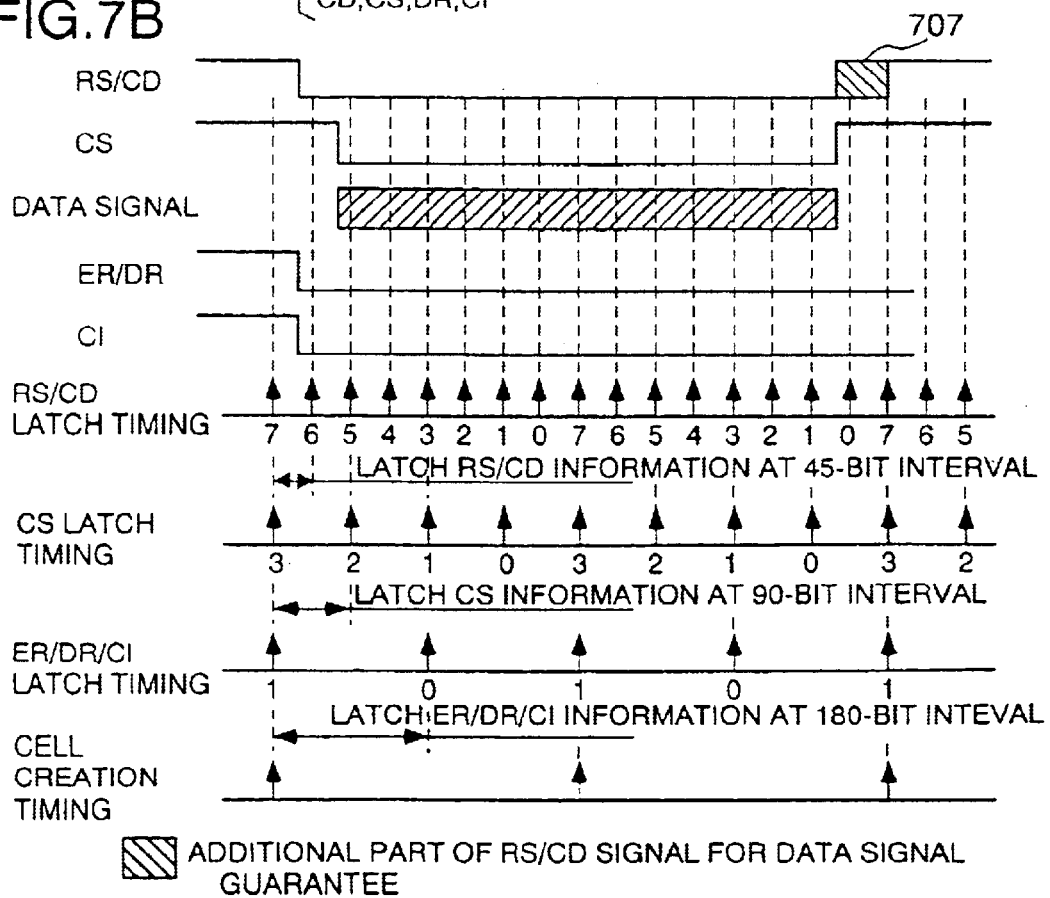
FIG. 7B is a timing chart of the control line signals to be multiplexed.

Information latched at the latch timing numbers shown in FIG. 7B are multiplexed at corresponding locations indicated by the latch timing numbers shown in FIGS. 5, 6.

Furthermore, the signal RS/CD is delayed with respect to the data signal in the RS/CD signal multiplexing process of the present embodiment so as to assurance the precise acquisition of the data signal and the control line signal data. Concretely, the signal RS/CD is delayed and multiplexed with an additional period of 45 bits after the latch timing number 1. A hatched area 707 in FIG. 7B shows the additional period of the signal RS/CD for the data signal assurance.

Accordingly, the signals RS and CD among the control line signals may be guaranteed with respect to the user data, and missing of the head portion or the bottom portion of the user data may be prevented.

Next, an example of block structure of a separation unit in the multiplexing equipment will now be explained with reference to FIG. 8.

Figure 8:
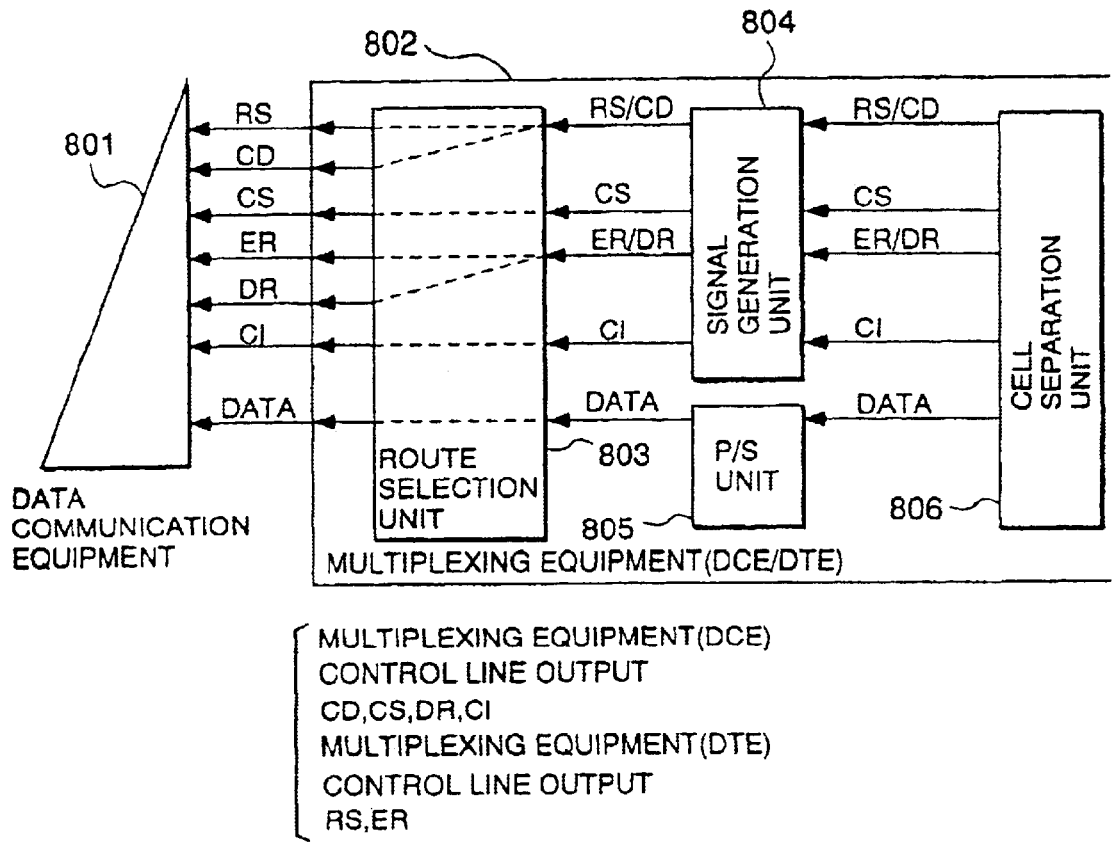
FIG. 8 is a schematic illustration showing a block structure of multiplexing equipment realizing the control line signal separation function in accordance with the present invention.

As shown in FIG. 8, the example of multiplexing equipment 802 comprises a cell separation unit 806, a signal generation unit 804, a P/S unit 805 and a route selection unit 803.

In the example of the multiplexing equipment, the cell separation unit 806 separates the cells transmitted and inputted through the ATM network into the data signal and the control line signals.

The parallel data signal is converted at the P/S unit 805 to serial data signal. The serial data is routed at the route selection unit 803 in accordance with a current mode of DCE or DTE, and outputted to the data communication equipment 801.

The separated control line signals become the signals RS/CD, CS, ER/DR, CI. The signal generation unit 804 generates the signal RS/CD at a 45-bit interval of the terminal speed based on data signal in the cell. Furthermore, the signal generation unit 804 generates the signal CS at a 90-bit interval, and the signal ER/DR/CI at a 180-bit interval. The generated signals are routed at the route selection unit 803 in accordance with a current mode of DCE or DTE, and outputted to the data communication equipment 801.

In the present embodiment, the multiplexing equipment is provided with a function enabling the transmission of the control line signals in the ATM network. Alternatively, the multiplexing equipment of the present invention may comprise additional means for disabling such a transmission function of the control line signals.

Figure 9:
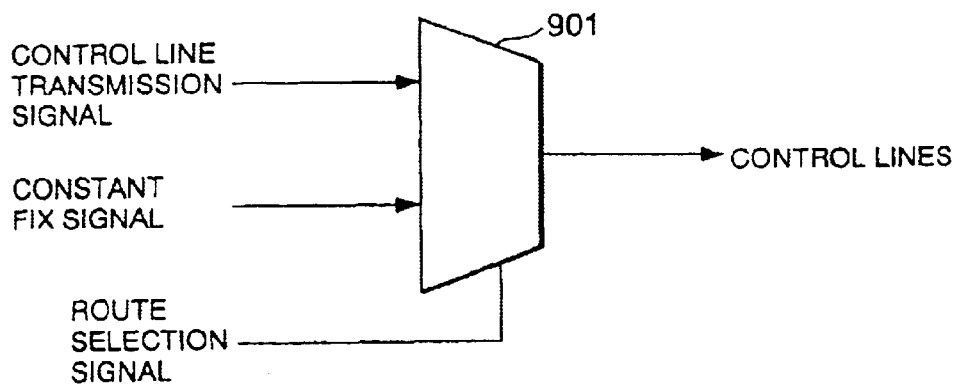
FIG. 9 is a schematic illustration showing an example of a selector selecting one of the control line signal transmission mode and the constant fix mode in accordance with the present invention.

For example, the multiplexing equipment of the present invention may be provided with a selector 901 shown in FIG. 9. In this example, a control line transmission signal indicating the control line information and a constant fix signal indicating that an operational mode is in the full duplex communication by sending a ON/OFF signal are inputted to the selector 901. The selector 901 determines if the input control line information should be outputted by selecting one of those two signals in accordance with a route selection signal indicating a mode to be selected among the control line signal transmission mode and the constant fix mode.

Figure 10:
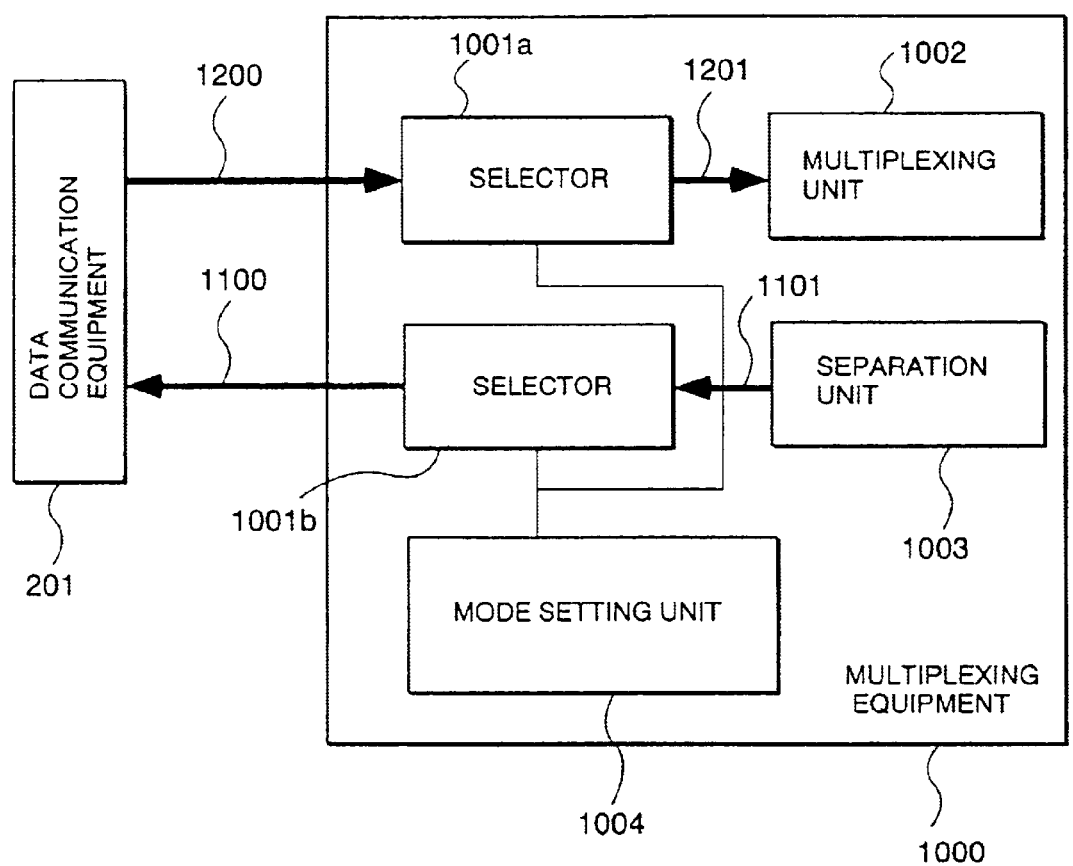
FIG. 10 is a schematic illustration showing another example of block structure of the multiplexing equipment in accordance with the present invention.

Alternatively, as shown in FIG. 10, the multiplexing equipment 1000 of the present invention may be provided with a multiplexing unit 1002 performing the multiplexing function shown in FIG. 7, a separation unit 1003 performing the separation function shown in FIG. 8, selectors 1001a, 1001b having the similar functions of the selector 901 shown in FIG. 9, and a mode setting unit 1004 for controlling selection effort of the selectors 1001a, 1001b.

According to the multiplexing equipment 1000 of the present example, when the mode setting unit 1004 sets the control line signal transmission mode to be selected, the selector 1001a outputs the control line signals and the user data signal outputted from the data communication equipment 201 to the multiplexing unit 1002 without any changes, and the selector 1001b outputs the control line signals and the user data signal outputted from the separation unit 1003 to the data communication equipment 201. When the mode setting unit 1004 sets the constant fix mode to be selected, no control line signal is transmitted, and only the user data signals are inputted to the multiplexing unit 1002 and outputted from the separation unit 1003.

According to the present invention, it is possible to provide the cell creation method for the control line signals and the multiplexing equipment using such a method by which the control line signals, which are not used in the ATM network of prior art, can be transmitted.

Furthermore, according to the present invention, it is possible to provide means for modifying the signal RS/CD among the control line signals to be transmitted so as to prevent the missing of the head portion or the bottom portion of the user data signal, and to assure the full acquisition of the signal.

What is claimed is:

1. A cell creation method of control line signals for an ATM network comprising a plurality of multiplexing equipments realizing communication among information terminals, comprising the steps of:

creating cells from user data to be transmitted from one of said information terminals to another one of information terminals and control line information input from said one information terminal at a multiplex equipment connected to said information terminals, said control line information indicating a control line signal including a Receive Data/Carrier Detect (RS/CD) signal being necessary for said another information terminal to receive said user data through half-duplex communication, and transmitting said cells including said user data and said control line information to said another information terminal.

2. A cell creation method of control line signals in accordance with claim 1, wherein a portion of a cell payload to be transmitted is mapped for transmitting said control line signals when creating said cell from said control line information, and said control line information is multiplexed into said cell at the transmission side and separated from said cell at reception side.

3. A cell creation method of control line signals for an ATM network comprising a plurality of multiplexing equipments realizing communication among information terminals, comprising the steps of:

creating cells from user data to be transmitted between a pair of the communicating information terminals and control line signals indicating control line information relating the transmission of said user data at said multiplexing equipment connected to said pair of the communicating information terminals respectively; and transmitting said cells including said user data and said control line information between said pair of the communicating information terminals, wherein a portion of a cell payload to be transmitted is mapped for transmitting said control line signals when creating said cell from said control line information, wherein said control line information is multiplexed into said cell at the transmission side and separated from said cell at reception side, and wherein a Receive Data/Carrier Detect (RS/CD) signal of said control line signals is extended for a predetermined period before said RS/CD signal is multiplexed.

4. A cell creation method of control line signals in accordance with claim 1, wherein said multiplexing equipment connected to said pair of the communicating information terminals has two operating modes which can be selected, one being a control line signal transmission mode for transmitting said control line information, the other being a constant fix mode for executing a full duplex communication.

5. A multiplexing equipment, being one of a plurality of multiplexing equipment included in an ATM network for realizing communication between information terminals, connected to a pair of the information terminals, comprising:

multiplexing means for creating cells from user data to be transmitted from one of said information terminals to another one of information terminals and control line information input from said one information terminal, said control line information indicating a control line signal including a Receive Data/Carrier Detect (RS/CD) signal being necessary for said another information terminal to receive said user data through half-duplex communication, and means for transmitting said cells including said user data and said control line information to said another information terminal at reception side.

6. A cell creation method of control line signals in accordance with claim 1, wherein said RS/CD signal is extended for a predetermined period before data of said RS/CD signal is multiplexed.

7. A multiplexing equipment, being one of a plurality of multiplexing equipment included in an ATM network for realizing communication between information terminals, connected to a pair of the communicating information terminals, comprising:

multiplexing means which creates cells from user data output from one of said pair of information terminals and control line information input from said one information terminal, said control line information indicating a control line signal including a Receive Data/Carrier Detect (RS/CD) signal being necessary for said another information terminal to receive said user data through half-duplex communication, and separation means separating said control line information and said user data from said cells transmitted via said ATM network and outputting said separated control line information and the user data to one of said information terminal reception side.

8. A multiplexing equipment according to claim 7, wherein said multiplexing means maps a portion of a cell payload to be transmitted for transmitting said control line signals when creating said cell from said control line information.

9. A multiplexing equipment according to claim 7, wherein said multiplexing means comprising:

extending means for extending said RS/CD signal for a predetermined period before data of said RS/CD signal is multiplexed.

10. A multiplexing equipment according to claim 7, comprising:

two operating modes which can be selected, one being a control line signal transmission mode for transmitting said control line signals by creating said cell from said control line information, the other being a constant fix mode for executing a full duplex communication.

* * * * *